US012341841B2

(12) United States Patent
Pantos

(10) Patent No.: US 12,341,841 B2
(45) Date of Patent: Jun. 24, 2025

(54) SYSTEMS AND METHODS OF USING A MEDIA BIT RATE CURVE FOR STREAMING BIT RATE ADAPTION

(71) Applicant: Apple Inc., Cupertino, CA (US)

(72) Inventor: Roger N. Pantos, Scotts Valley, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 18/046,985

(22) Filed: Oct. 17, 2022

(65) Prior Publication Data
US 2023/0118415 A1 Apr. 20, 2023

Related U.S. Application Data

(60) Provisional application No. 63/257,711, filed on Oct. 20, 2021.

(51) Int. Cl.
*H04L 65/75* (2022.01)
*H04L 65/61* (2022.01)

(52) U.S. Cl.
CPC ............ *H04L 65/764* (2022.05); *H04L 65/61* (2022.05)

(58) Field of Classification Search
CPC ..... H04L 65/764; H04L 65/61; H04L 65/752; H04L 65/612; H04L 65/80; H04L 65/75
See application file for complete search history.

(56) References Cited

U.S. PATENT DOCUMENTS

| 7,345,671 | B2 | 3/2008 | Robbin et al. |
| 11,539,961 | B1* | 12/2022 | Hallmarker .... H04N 21/234381 |
| 2004/0224638 | A1 | 11/2004 | Fadell et al. |
| 2014/0282792 | A1* | 9/2014 | Bao .......... H04L 65/80 725/116 |
| 2016/0073106 | A1* | 3/2016 | Su .......... H04N 21/8456 375/240.02 |
| 2016/0094468 | A1* | 3/2016 | May, Jr. ............ H04L 47/52 709/231 |
| 2016/0205164 | A1* | 7/2016 | Schmidt ............ H04N 21/8456 709/219 |
| 2017/0078345 | A1* | 3/2017 | Pantos .............. H04L 65/61 |
| 2019/0327510 | A1* | 10/2019 | Kalagi ............ H04N 21/44209 |
| 2020/0112599 | A1* | 4/2020 | Ramamurthy ........ H04L 65/613 |
| 2022/0067883 | A1* | 3/2022 | Garg ................. H04N 19/147 |

* cited by examiner

*Primary Examiner* — Tonia L Dollinger
*Assistant Examiner* — Mehulkumar J Shah
(74) *Attorney, Agent, or Firm* — BakerHostetler

(57) ABSTRACT

A method and apparatus of a device that receives streaming content is described. In an exemplary embodiment, the device receives a media playlist for the content, wherein the media playlist references a plurality of media stream and each of the plurality of media stream are encoded at a different bit rate. The device further determines an initial media stream selected from the plurality of media stream. In addition, the device examines a window of media segments of the initial media stream and determines a local bit rate curve from the window of media segments. The device further selects another one of the plurality of media streams using at least the local bit rate curve.

20 Claims, 8 Drawing Sheets

```
MASTER PLAYLIST 202

MEDIA STREAM PLAYLIST 204A      BIT_RATE=128KBPS    OTHER_METADATA
MEDIA STREAM PLAYLIST 204B      BIT_RATE=1.0MBPS    OTHER_METADATA
MEDIA STREAM PLAYLIST 204C      BIT_RATE=2.5MBPS    OTHER_METADATA
                •
                •
                •
MEDIA STREAM PLAYLIST 204N      BIT_RATE=4.0MBPS    OTHER_METADATA
```

```
MEDIA STEAM PLAYLISTS 212

MEDIA STREAM PLAYLIST 204A      BIT_RATE=200KBPS    OTHER_METADATA
    SEGMENT 206A    DUR=6S      BIT_RATE=128KBPS    URI OTHER_MD
         •
         •
    SEGMENT 206N    DUR=6S      BIT_RATE=200KBPS    URI OTHER_MD
MEDIA STREAM PLAYLIST 204B      BIT_RATE=1.0MBPS    OTHER_METADATA
    SEGMENT 208A    DUR=10S     BYTE_RN=0,2000      URI OTHER_MD
         •
         •
    SEGMENT 208N    DUR=10S     BYTE_RN=32000,36000     URI
OTHER_MD
MEDIA STREAM PLAYLIST 204C      BIT_RATE=2.5MBPS    OTHER_METADATA
    SEGMENT 210A    DUR=9S      URI     OTHER_MD
         •
         •
    SEGMENT 210N    DUR=9S      URI     OTHER_MD

MEDIA STREAM PLAYLIST 204N      BIT_RATE=4.0MBPS    OTHER_METADATA
```

FIG. 2

SYSTEMS AND METHODS OF USING A MEDIA BIT RATE CURVE FOR STREAMING BIT RATE ADAPTION

This application claims the benefit of U.S. Provisional Patent Application No. 63/257,711, filed on Oct. 20, 2021, which application is incorporated herein by reference.

FIELD OF INVENTION

This invention relates generally to real-time communications and more particularly to using a media bit rate curve to drive streaming bit rate adaptation.

BACKGROUND OF THE INVENTION

An adaptive bit rate (ABR) streaming system consists of a playback service executed by a player and a server. The server offers a set of media encodings of a program, each encoded at a different bit rate ("bit rate tiers") and divided into short (10s or less) individually downloadable media segments, and a manifest that describes each bit rate tier. The player downloads the manifest, chooses a bit rate tier, and begins playing it by successively downloading and playing short segments. While playing, the player can switch to a different bit rate tier that is better matched to the current network download speed to optimize the user experience. Switching to different bit rate tiers can be done based on peak and average bit rates with the current network speed.

While peak and average provide a rough guide however, at certain points in the program they may not lead to the best choice. For instance, a particular program may have only a brief high-motion scene which inflates its peak while the remainder of the program is half or less of that bit rate; a player that depends only on the peak would never choose that tier if it was above the network speed, even while playing other parts of the program. Alternatively, a program with several sharp peaks can be surrounded by "valleys" of scenes that use fewer bits will have some scenes that require high speed than the average bitrate and other scenes that require less than the average bit rate. The player that depends only on the average bit rate may some times switch to a tier that it cannot in fact sustain at the current point in the program and other times may overlook a tier that it can sustain because it requires less than the average.

SUMMARY OF THE DESCRIPTION

A method and apparatus of a device that receives streaming content is described. In an exemplary embodiment, the device receives a media playlist for the content, wherein the media playlist references a plurality of media stream and each of the plurality of media stream are encoded at a different bit rate. The device further determines an initial media stream selected from the plurality of media stream. In addition, the device examines a window of media segments of the initial media stream and determines a local bit rate curve from the window of media segments. Furthermore, the window of media segments may begin at the current point of playback and may move forward as playback proceeds. The device further selects another one of the plurality of media streams using at least the local bit rate curve.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 2 is an illustration of one embodiment of a master playlist and media stream playlist for media client.

DETAILED DESCRIPTION

Figure 1:
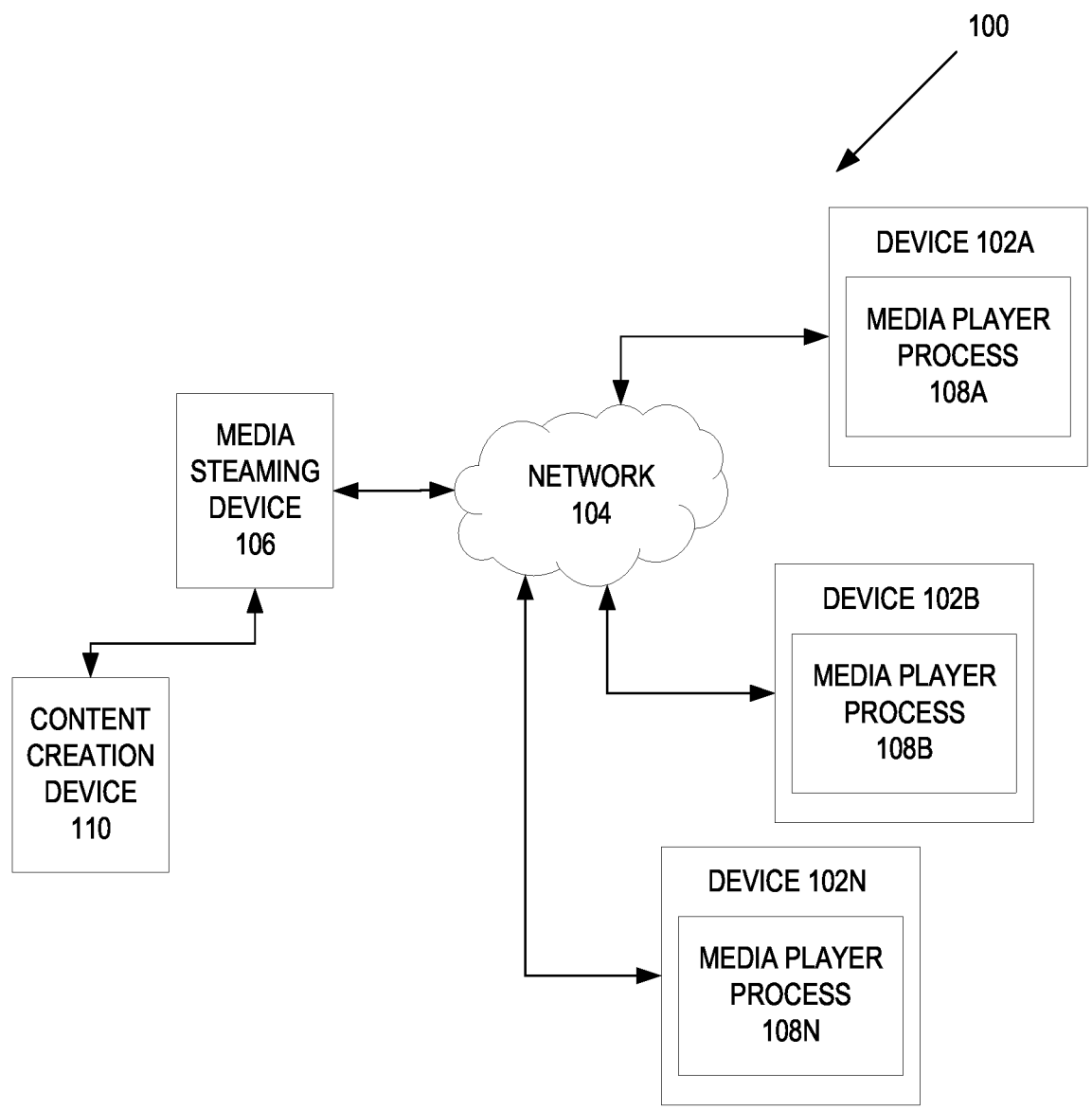
FIG. 1 is an illustration of one embodiment of a system that streams media to multiple clients.

A method and apparatus of a device that receives streaming content is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that receives streaming content is described. In one embodiment, an adaptive bit rate (ABR) streaming system consists of a playback service executed by a player and a server. The server offers a set of media encodings of a program, each encoded at a different bit rate ("bit rate tiers") and divided into short (10s or less) individually downloadable media segments, and a manifest that describes each bit rate tier. The player downloads the manifest, chooses a bit rate tier and begins playing it by successively downloading and playing short segments. While playing, the player can switch to a different bit rate tier that is better matched to the current network download speed to optimize the user experience.

In a typical ABR system such as HTTP Live Streaming (HLS), the manifest specifies the peak segment bit rate of the bit rate tier (essentially the bit rate of the highest bit-rate segment) and may also specify the average (mean) segment bit rate, essentially the average of every individual segment bit rate. Comparing a bit rate tiers peak and/or average bit rate with the current network speed can help a player decide if it is a candidate to switch to.

While peak and average provide a rough guide however, at certain points in the program they may not lead to the best choice. For instance, a particular program may have only a brief high-motion scene which inflates its peak while the remainder of the program is half or less of that bit rate. A player that depends only on the peak would never choose that tier if it was above the network speed, even while playing other parts of the program. Similarly, a program with several sharp peaks surrounded by "valleys" of scenes that use fewer bits will have some scenes that require high speed than the average bitrate and other scenes that require less than the average bit rate. A player that depends only on the average bit rate may some times switch to a tier that it cannot in fact sustain at the current point in the program, and other times may overlook a tier that it can sustain because it requires less than the average.

In HLS, each bit rate tier has one or more "media playlists" that specify every media segment (as a URL) and its descriptive metadata (as "tags"). Two of these tags, the EXT-X-BITRATE tag and the EXT-X- BYTERANGE tag, along with the EXTINF tag, describe the bit rate of each individual segment. By examining the segment descriptions immediately following the playhead in the current media playlist, the player can determine the immediate future segment bit rate curve, alternatively called a local bit rate curve. In one embodiment, a playhead is the position in the content stream that is the current point of playback. In one embodiment, the player can make use of the local bit rate curve of a first bit rate tier to estimate the network speed requirement of switching to a second bit rate tier for at least a period of time following the current point of playback.

There are various approaches to estimating this network speed requirement. If the media playlist for the second bit rate tier is available, its local bit rate curve is directly known. A player may for example choose a window size (such as the 60s following the playhead) and select the highest peak within that window as the network speed requirement.

When the media playlist for the second bit rate tier is not available, the player may take advantage of the fact that because each encoding has the same source, the bit rate curves are of roughly similar shapes, even though a higher bit rate tier will have higher absolute bit rate numbers than a lower bit rate tier. A player can for example compute the current network speed requirement of the first bit rate tier (which is available) and then use that in combination with the peak/average bit rates of the first bit rate tier and the peak/average bit rates of the second bit rate tier to project a network speed requirement of the second bit rate tier.

Because the window of future time moves forward as the playhead moves forward, the player periodically re-evaluates the current local bit rate curve as it plays. If a peak moves into the window, the player may decide that it will not be able to download the peak without pausing playback and so it must switch to a lower bit rate tier to sustain uninterrupted playback. If a valley moves into the window, the player may decide that it can afford to improve the quality shown to the viewer by switching to a higher bit rate tier that can still be sustained by the current network speed, at least through the current window.

This approach works best when the media playlist of every bit rate tier includes tags that allow the player to calculate the bit rate of every segment. Sometimes in HLS, however, the media playlist does not have each segment bit rate; it only indicates the (time) duration of each segment. In this case it is still possible to deploy a limited version of this approach: as each segment starting from the playhead position is downloaded for pre-buffering, the player discovers its segment size (and therefore its bit rate). It can use this information to produce a partial local bit rate curve (to the extent that it can download ahead of the playhead and then use the projection method described earlier to decide if other bit rate tiers are candidates to switch to.

FIG. 1 is an illustration of one embodiment of a system 100 that streams media to multiple clients 102A-N. In FIG. 1, system 100 includes a set of devices 102A-N that are coupled to a media streaming device 106 via the network 104. In addition, the media streaming device 106 is coupled to a content creation device 110. In one embodiment, each of the device 102A-D, the media streaming device 106, and/or content creation device 106 can, independently, be any type of device that can support media streaming (e. g., smartphone, laptop, personal computer, server, tablet, wearable, vehicle component, and/or any type of device that can process instructions of an application). In addition, the network 104 can be any type of network that supports media streaming (e.g. Wi-Fi, Cellular, Bluetooth, Ethernet, another type of network, and/or a combination therein). Furthermore, the media may consist of previously recorded (on-demand) material, or material that is being recorded as the stream is in progress (live). Each of the devices 102A-N can include a media player process 108A-N (alternatively known as a player) that is used to request content and select a media stream for that content.

In one embodiment, the content creation device 106 creates a master playlist for a piece of content. In this embodiment, a master playlist which includes multiple media streams of the same media presentation, where the different media streams can be the same content, but encoded at different bitrates. For example, and in one embodiment, the different media streams for the same content can be encoded at different rates, such at a 4.0 Mbps (megabits per second), 2.5 Mbps. 1.0 Mbps, and 128 kbps (kilobits per second). Each of the devices 104A-N can switch between different media streams in the presentation of the content depending on the actual network conditions.

A needed bandwidth for a media stream can be a value determined by a server or some other system which determines or estimates the maximum bit rate of any single segment of the content when the content is presented; the average bandwidth is a bit rate of the content while presented which is an average amount over time. In one embodiment, the average bandwidth can be calculated or determined over the entire time of the content. For example, if the content is a one-hour TV show, then the average bandwidth is determined over the one-hour period of time.

In one embodiment, the average bandwidth can be calculated by dividing the total amount of transmitted content (in, for example, bits, bytes, kilobytes, etc. for the entire period of time that the content is normally presented) by that period of time. The average bandwidth can be expressed as a number of bits per second and can be approximated through rounding of any calculated value. The peak bandwidth and the average bandwidth values are based on the data in the stream when the content is presented (e.g., displayed) at normal ("1×") playback speed and these values are independent of the speed of the download connection between a server (that transmits the content to a client) and the receiving client. It will be understood that the average bandwidth or bit rate is normally less than the peak bandwidth or bit rate. For example, many videos have scenes which do not vary over time and those scenes tend to have lower bit rates and thus the average bit rate or bandwidth for a video with such scenes will be lower than a peak bandwidth for the video which can occur during an action scene where objects, images, etc. are moving rapidly across the screen or colors are rapidly changing, etc. An example of a sample master playlist which includes peak bandwidth and average bandwidth values for each variant in the master playlist is provided below. Thus, the actual needed bandwidth can vary over time. In addition, the amount of available bandwidth in the network can change over time depending on the amount of network congestion in the network links between the media streaming device 106 and the devices 102A-N. In one embodiment, a device (e.g., device 102A) can requests content and initially select one of the media streams for this content (e.g. 2.5 Mbps encoded bit rate media stream). If the network available bandwidth drops, the device 102A can switch to a less encoded media stream (e.g., a 1.0 Mbps encoded bit rate media stream). Alternatively, if there is little or no network congestion, the device 102A can switch to a higher bit encoded media stream (e.g., a 4.0 Mbps encode bit rate media stream).

In one embodiment, the device (e.g., device 102A) switches media streams by calculating a local bit rate curve for the media stream segment within a window from a playhead of the current media stream.

FIG. 2 is an illustration of one embodiment of a master playlist 202 and media stream playlist 204A-N for a media client. In FIG. 2, the master playlist 202 is used by a player to select which media stream to stream the content. In one embodiment, the master playlist 202 includes multiple media stream playlists 204A-N. In this embodiment, each of the media stream playlists 204A-N represents a different encoded bit rate. In this embodiment, media stream playlist 204A has an encoded bit rate of 200 kbps, media stream playlist 204B has an encoded bit rate of 1.0 Mbps, media stream playlist 204C has an encoded bit rate of 2.5 Mbps, and media stream playlist 204A has an encoded bit rate of 4.0 Mbps. In one embodiment, these encoded bit rate at the stream level is an average bit rate. The actual bit rate can fluctuate due to the nature of the encoding and the type of content. Complex or fast moving scenes can have a higher actual bit rate when transmitted from the media streaming device to the client, whereas talking scenes, landscape panning, or other less complex scenes can have a lower bit rate as more compression in the encoding can be used. In addition, each of the media stream playlist 204A-N has additional metadata associated with the media stream (e.g., language type, codec type, audio type, and/or other types of metadata that are used to playback the media stream). Each of the media stream playlists 204A-N in the master playlist 202 includes a reference to the corresponding media stream playlist in the media stream playlists 212.

In the media stream playlists 212, each of the media stream playlists 204A-N includes different segments that are composed of that media stream playlist 204A-N. In this embodiment, a segment is used to define a short unit of content in the media stream playlist 204A-N. For example, and in one embodiment, each segment can be of a duration of 6-10 seconds that is a distinct unit of content that is downloaded by the receiving device. For example, and in one embodiment, media stream playlist 204A includes segments 206A-N. Each of these segments 206A-N have a duration of six seconds, a Uniform Resource Identifier (URI), and other metadata associated with that segment. Each segment, however, can have a different bit rate. For example, and in one embodiment, segment 206A has an encoded bit rate of 128 kbps, whereas segment 206N has an encoded bit rate of 200 kbps. In this embodiment, because the bit rates of the segment can vary, the player reading the media stream playlist 204A can have an idea of the resources needed for each upcoming segment. By designating the bit rate for that segment, a player can determine the total number of bits being transmitted with this segment.

While in one embodiment, the segments can explicitly state the individual bit rate, in alternate embodiments, the segments can define the amount of bytes for each segment by designating a byte range. This byte range can designate the initial byte and the ending byte for the segment and can be used in conjunction with URI to retrieve the segment. In addition, the player can compute a bite rate for the segment using the byte range and the duration. For example, and in one embodiment, media stream playlist 204B includes segments 206A-N that include the byte range as part of the segment 208A-N metadata. As with the segments 206A-N of media stream playlist 204A, segments 208A-N each have a duration indicator (in this case, each segment duration segment is ten seconds), a URI, and other metadata. However, instead of an indicated bit rate as in segments 206A-N, segments each have a byte range that are the byte used for the content. The player can use the byte range to determine an average bit rate for that segment. In a further embodiment, a segment does not need to have a bit rate or byte range designation. Instead, the segment can have neither of those indicators. The player can determine the size of the segment by loading the segment into a pre-buffer and counting the number of bytes loaded. For example, and in one embodiment, media stream playlist 204C includes segments 210A-N that duration of nine seconds each, a URI and other metadata. These segment 210A-N lack a bit rate or byte range indication, so a player would determine the average bite rate for each segment by loading the segment into the pre-buffer, counting the number of bytes in the segment, and computing the average bit rate for that segment.

In one embodiment, with the player knowing each of the segment average bit rates, the player can compute a local bit rate curve from a window of segments. In this embodiment, a local bit rate curve plots the segment average bite for each segment versus time over the window. The window can be a varying sized window of 30 seconds-2 minutes, or can be shorter or longer. The player determines the average bit rate (whether explicitly indicated, or being computed as stated above) for each segment and plots this average bit rate over time.

With the local bit rate curve, the player can determine when to switch another media stream. In one embodiment, if the peak of the local bit rate curve is too high, the player can select one of the lower encoded bit rate streams. Alternatively, if the peak of the local bit rate curve is low, the player may decide to select one of the higher encoded bit rate media streams. In one embodiment, the player can decide whether to switch media streams by comparing the network bandwidth availability for the player with the bit rates with the different media streams. Calculating the local bit rate curve is further described in FIG. 3 below.

Figure 3:
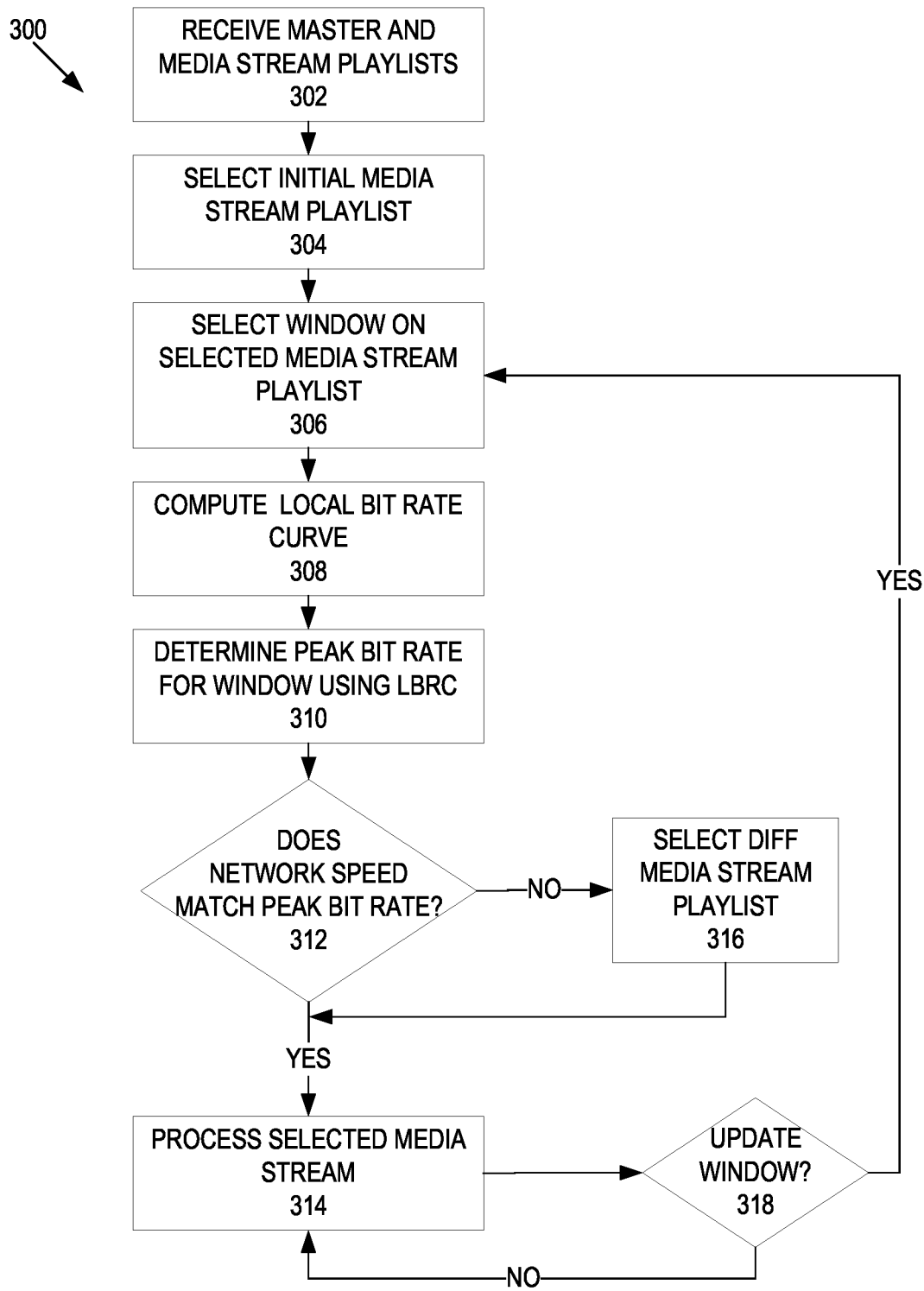
FIG. 3 is a flow diagram of one embodiment of a process that adapts media streaming to different bit rate tiers using a local bit rate curve.

FIG. 3 is a flow diagram of one embodiment of a process 300 that adapts media streaming to different bit rate tiers using a local bit rate curve. In one embodiment, process 300 is performed by a media stream selection process, such as the media player process 108A-N of devices 102A-N as described in FIG. 1 above. In FIG. 3, process 300 begins by receiving the master and media stream playlists at block 302. In one embodiment, the master and media stream playlists are the master and media stream playlists as described in FIG. 2 above. At block 304, process 300 selects an initial media stream playlist. In one embodiment, process 300 picks the first playable media playlist that appears in the master playlist. In this embodiment, this allows the content producer to determine the starting bit rate. In another embodiment, process 300 can use a recent history of network requests (if available) to estimate the current network speed, and to compare that to the peaks and averages of the tiers in the master playlist to choose something appropriate. In addition, process 300 processes the initial media stream playlist, so that the process 300 has processed the segment information. Process 300 selects a window on the select media stream playlist at block 306. In one embodiment, process 300 selects a fixed window from the playhead of the media stream. In this embodiment, process 300 could have a fixed window such as one minute or a different value. In another embodiment, process 300 can have a dynamic window, with different values for different sections of the content.

At block 308, process 300 computes the local bit curve for the window. In one embodiment, process 300 determines an average bit rate for each segment and computes the local bit rate curve from the segment average bit rates. Calculating of the local bit rate curve is further described in FIG. 4 below. Process 300 determines a peak bit rate for the window at block 310. In one embodiment, process 300 determines the top value from the local bit rate curve. Determining the peak bit rate is further described in FIG. 5 below.

At block 312, process 300 determines if the network speed matches the peak bit rate. In one embodiment, process 300 can match the network speed with the peak bit rate if the peak bit rate is the highest available of the bit rate tiers that are at or below the network speed. In one embodiment, process 300 compares the peak bit rate of the window with a network availability value. In this embodiment, if the peak of the local bit rate curve is too high, process 300 can select one of the lower encoded bit rate streams. Alternatively, if the peak of the local bit rate curve is low, process 300 can select one of the higher encode bit rate media streams. In one embodiment, the player can decide whether to switch media streams by comparing the network bandwidth availability for the player with the bit rates with the different media streams. If one or more of the local bit rate curves of the other media streams is available, process 300 can use these to select the other media stream. If the local bit rate curve for the other media stream is not available, process 300 can estimate the local bit rate curve for the different media stream as the local bit rate curves will have similar features as the current local bit rate curve. In one embodiment, process 300 can use the ratio between the encoded bit rates of the current media stream and the other media streams.

If process 300 does not select another media stream (or if the network speed matches the peak bit rate), execution proceeds to block 314, where process 300 processes the selected media stream. In one embodiment, process 300 processes the data associated with each segment. If process 300 determines to select a different media stream (or if the network speed does not match the peak bit rate), process 300 selects the different media stream playlist corresponding to the selected media stream at block 316. Execution proceeds to block 314. At block 318, process 300 determines if the window should be updated. In one embodiment, because the window of future time moves forward as the playhead moves forward, the player must periodically re-evaluate the current local bit rate curve as it plays. If a peak moves into the window, process 300 can decide that process 300 will not be able to download the peak without pausing playback and so process 300 switches to a lower bit rate tier to sustain uninterrupted playback. If a valley moves into the window, the player may decide that it can afford to improve the quality shown to the viewer by switching to a higher bit rate tier that can still be sustained by the current network speed, at least through the current window.

Figure 4:
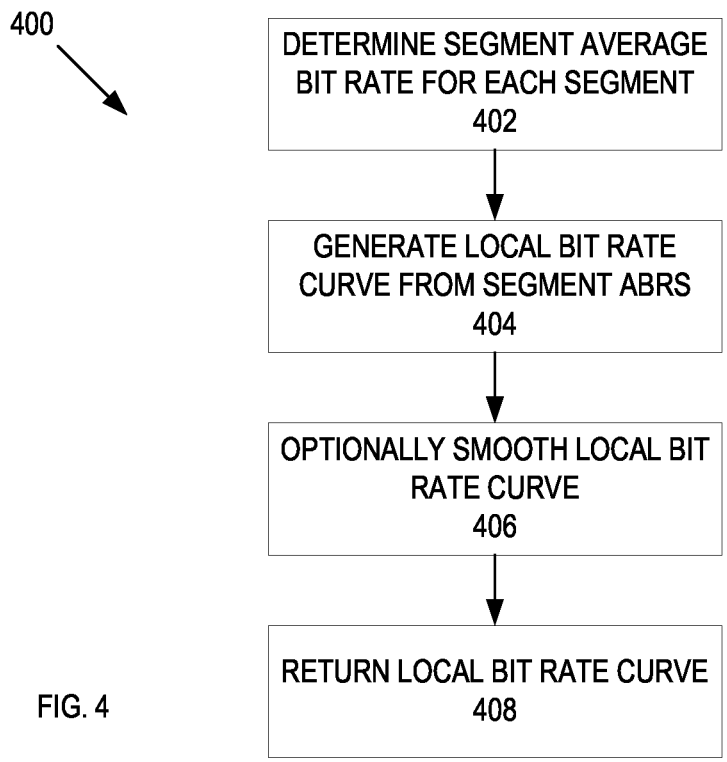
FIG. 4 is a flow diagram of one embodiment of a process that generates the local bit rate curve.

FIG. 4 is a flow diagram of one embodiment of a process 400 that generates the local bit rate curve. In FIG. 4, process 400 determines the segment average bit rate for each segment at block 402. In one embodiment, if the bite rate is known because of an indicator is in the segment, process 400 can retrieve the bit rate for the segment from the media stream playlist. Alternatively, if the segment defines a byte range, process 400 can determine the segment average bit rate by determining the total number of bytes, converting the number of bytes to an equivalent number of bits and dividing the number of bits by the segment duration. If there is no bit rate or byte range is in the segment metadata, process 400 can determine an average bit rate for the segment by counting the number of byte for the segment stored in a pre-buffer (or another type of buffer), converting the number of bytes to an equivalent number of bits and dividing the number of bits by the segment duration. With the segment average bit rates, process 400 can compute the local bit rate curve at block 404. In one embodiment, process 400 computes the local bit rate curve by associating each segment average bit rate with a time value for the segment (e.g., the beginning of the segment, end time of the segment, average time of the segment, or some other time value for the segment). Process 400 can optionally smooth the local bit rate curve at block 406. In one embodiment, the smoothing is used to reduce the effect of the peaks and valleys of the local bit rate curve on the selection or switching of the media streams. At block 408, process 400 returns the local bit rate curve at block 408.

Figure 5:
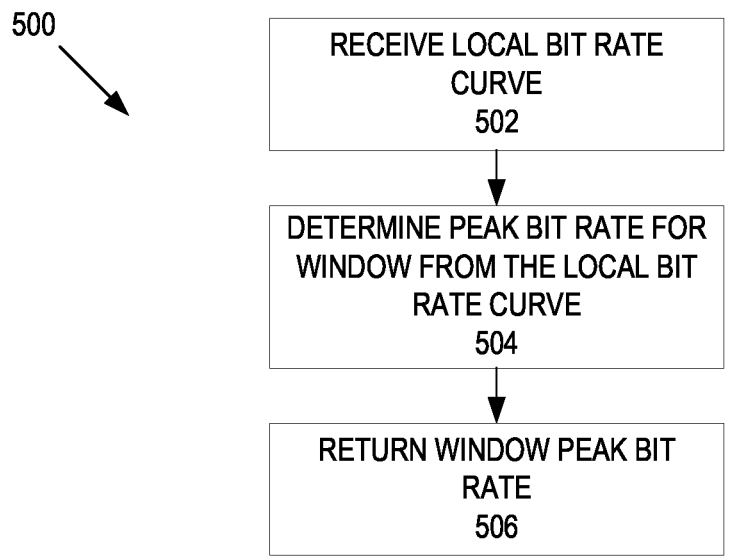
FIG. 5 is a flow diagram of one embodiment of a process that determines a window peak pit bate from the local bit rate curve.

FIG. 5 is a flow diagram of one embodiment of a process 500 that determines a window peak pit bate from the local bit rate curve. In FIG. 5, process 500 begins by receiving a local bit rate curve at block 502. At block 504, process 500 determines the peak bit rate for the window from the local bit rate curve. In one embodiment, the peak bit rate is the largest segment average bit rate in the window. In another embodiment, the peak bit rate is the high point from the local bit rate curve. In this embodiment, if the local bit rate curve is interpolated from the segment average bit rate, then the peak bit rate is the global maximum of the local bit rate curve, which can be determined using any of a number of known methods for determining a maximum in a curve. Process 500 returns the peak bit rate at block 506.

Figure 6:
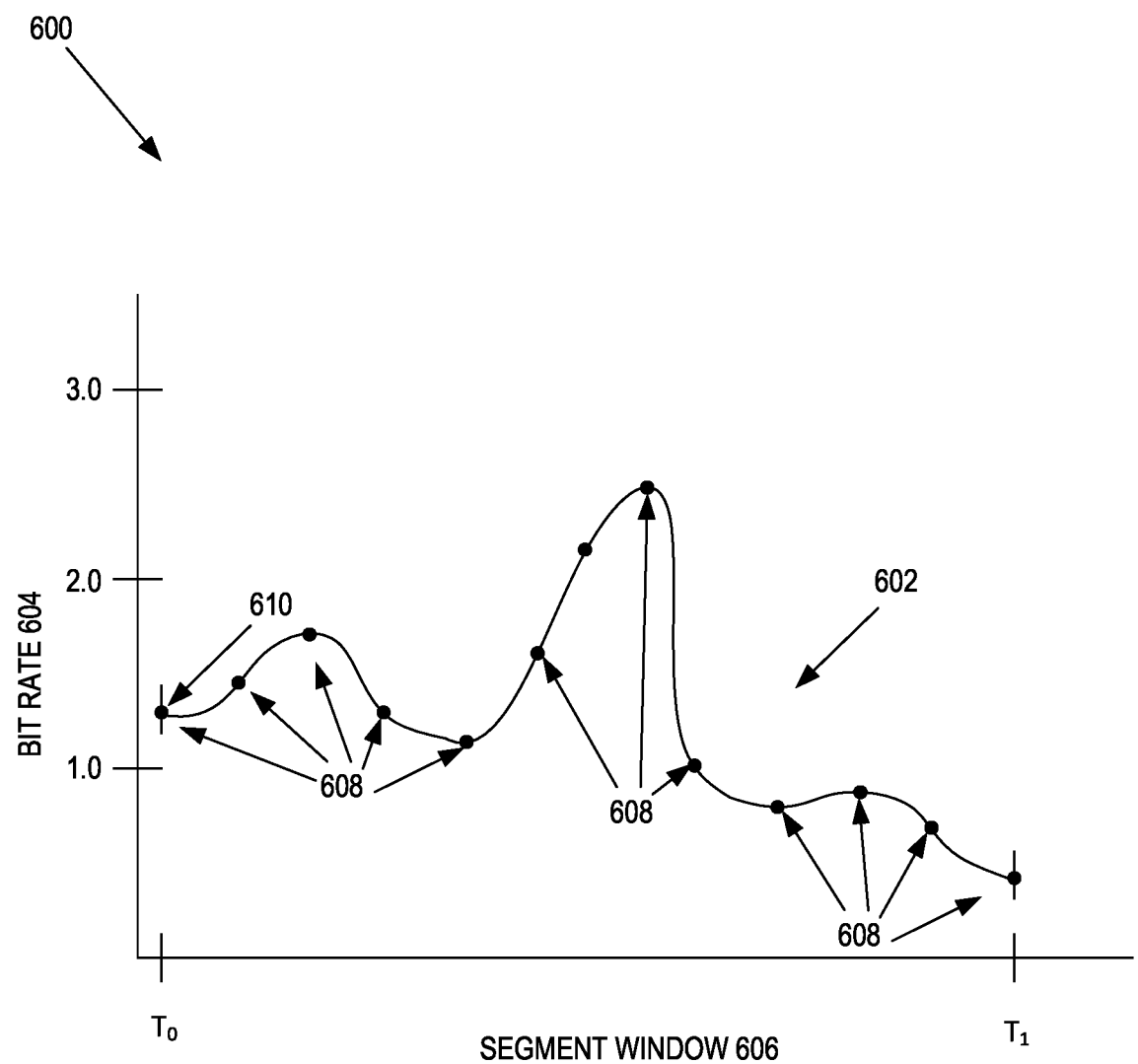
FIG. 6 is an illustration of a local bit rate curve for a window of segments.

FIG. 6 is an illustration of a local bit rate curve 602 for a window of segments. In FIG. 6, a plot 600 is illustrated that plots the local bit rate curve 602 in a plot of bit rate 604 versus segment window 606. In one embodiment, the local bit rate curve includes points 608 that are used to construct the local bit rate curve 602. Each of the points 608 represent one of the average bot rates for a segment. As illustrated in FIG. 6, there can be peaks representing more complex portions of the video that require a higher bit rate and valleys that represents less complex portions of the content that require a lower bit rate. For example, and in one embodiment, in FIG. 6, the local peaks have bit rates of 1.75 Mbps, 2.5 Mbps, 0.9 Mbps and the local valleys are 1.1 Mbps, 0.8 Mbps, and 0.4 Mbps.

Figure 7:
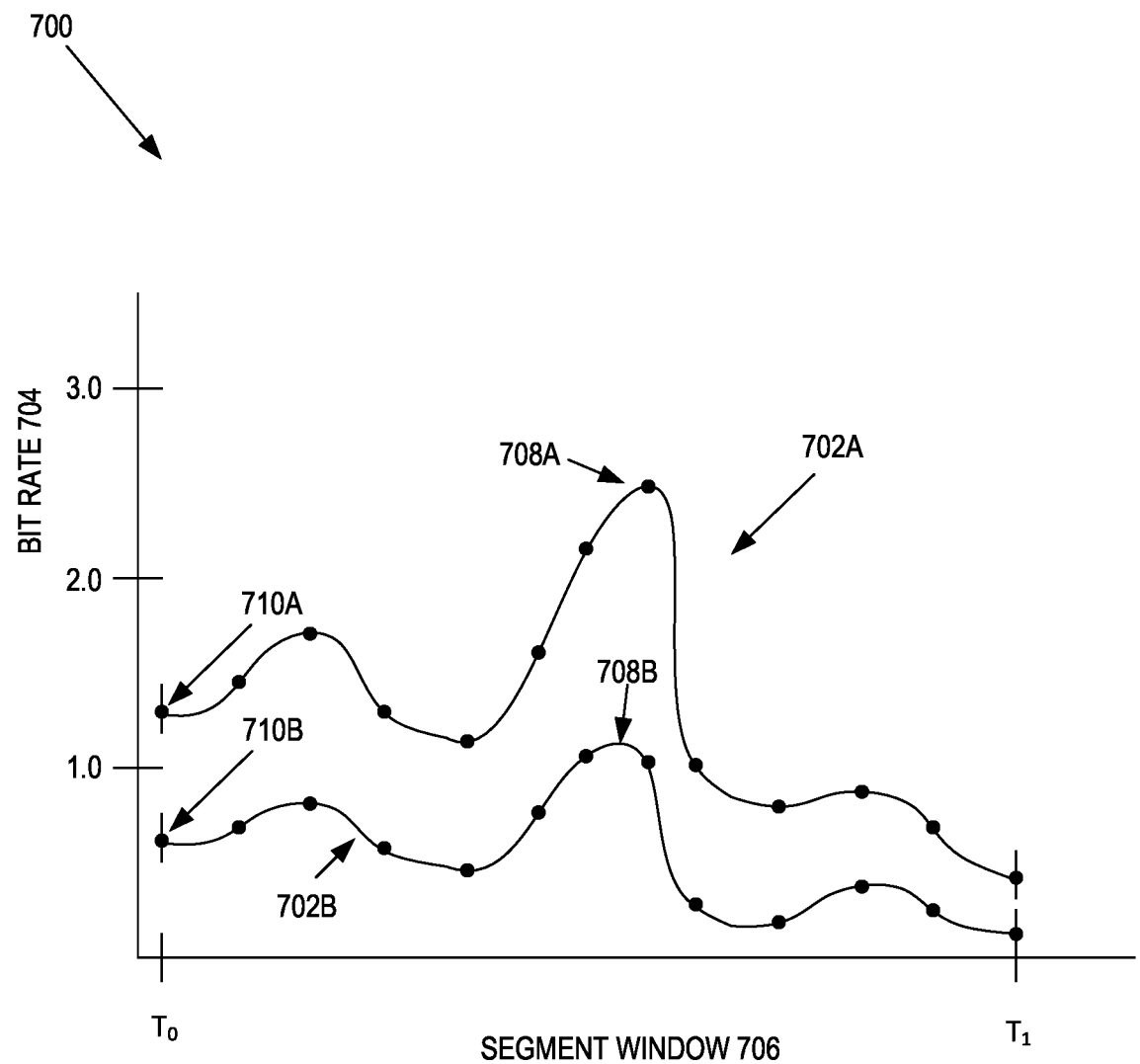
FIG. 7 is an illustration of two local bit rate curves for a window of segments.

FIG. 7 is an illustration of two local bit rate curves 702A-B for a window of segments. In FIG. 7, a plot 700 is illustrate of local bit rate curves 702A-B that are plots of bit rate 704 versus segment window 706. Local bit rate curve 702A represents a media stream that is encoded at a higher bit rate than the media stream represented in local bit rate curve 702B. Each curve includes a playhead 710A-B for the local bit rate curves 702A-B, respectively. In one embodiment, a player can use these curves 702A-B to decide whether to switch to another media stream. For example, and in one embodiment, if a player has selected a media stream represented by local bit rate curve 702A and determines that peak of 2.5 Mbps is too high for the current network conditions, the player may switch to the media stream represented by the local bit rate curve 702B. Alternatively, if a player has selected a media stream represented by local bit rate curve 702B and determines that peak of 1.1 Mbps is too low for the current network conditions, the player may switch to the media stream represented by the local bit rate curve 702B.

Figure 8:
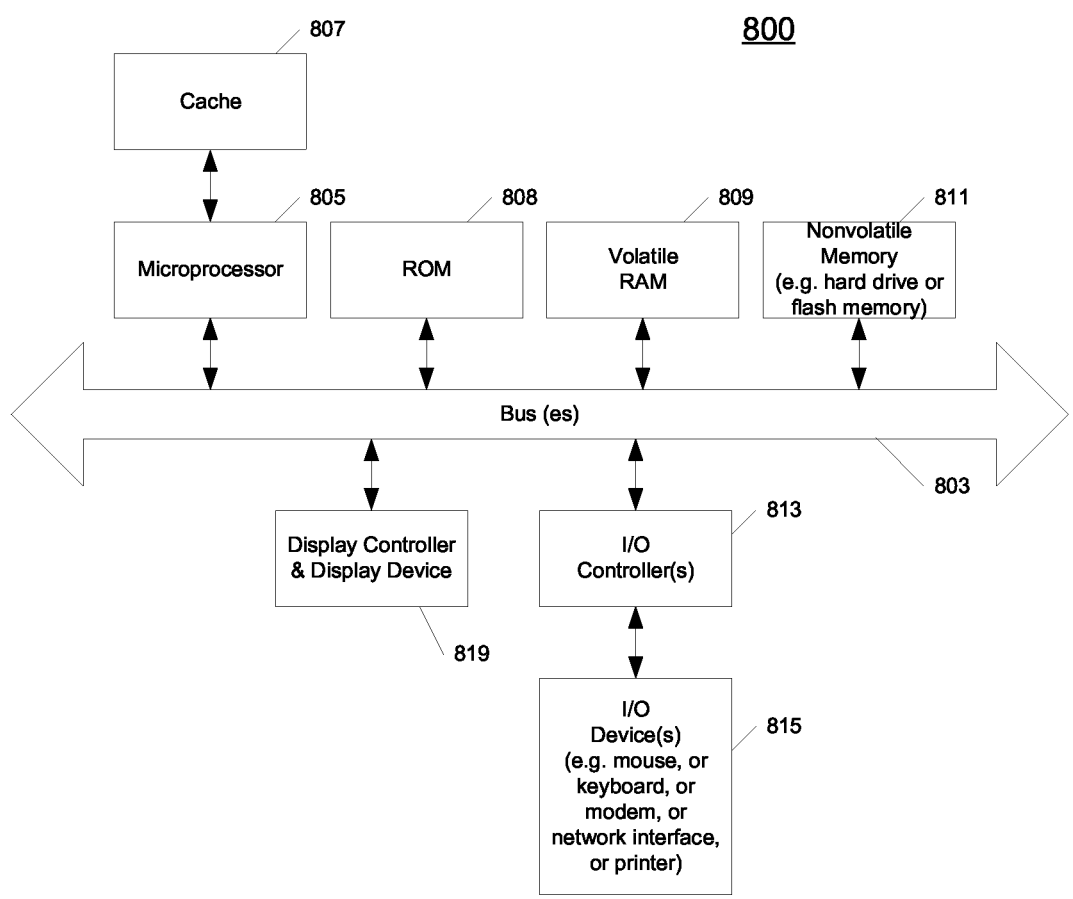
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented as a system that includes any one of devices 102A-N as illustrated in FIG. 1 above. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 801 and volatile RAM 809 and a non-volatile memory 8011. The microprocessor 805 may include one or more CPU(s), GPU(s), a specialized processor, and/or a combination thereof. The microprocessor 805 may retrieve the instructions from the memories 807, 809, 8011 and execute the instructions to perform operations described above. The bus 803 interconnects these various components together and also interconnects these components 805, 807, 809, and 8011 to a display controller and display device 819 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 8011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 8011 will also be a random access memory although this is not required. While FIG. 8 shows that the mass storage 8011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
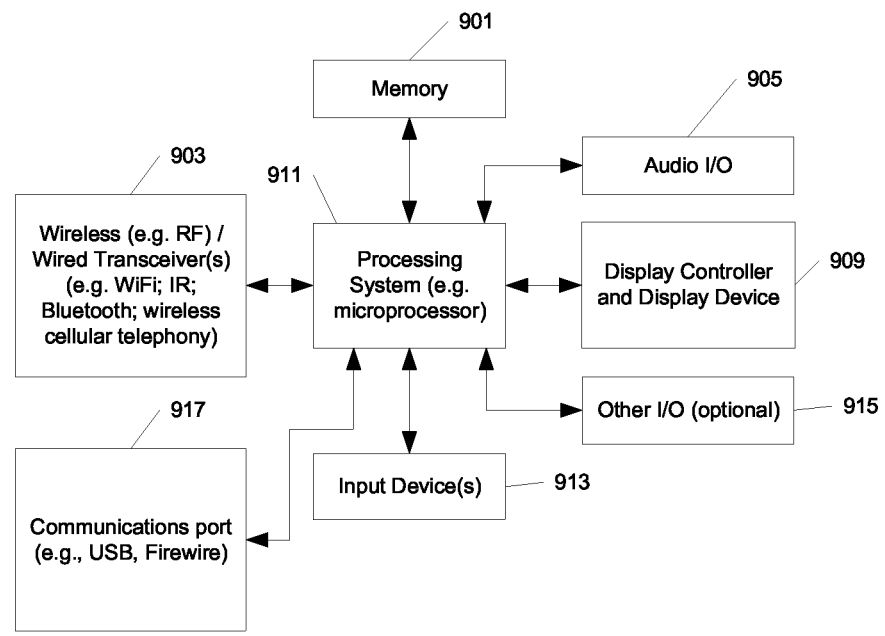
FIG. 9 shows an example of a data processing system, which may be used with one embodiment of the present invention.

FIG. 9 shows an example of another data processing system 900 which may be used with one embodiment of the present invention. For example, system 900 may be implemented as any one of devices 102A-N as shown in FIG. 1 above. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905, which may include a microphone and a speaker for, for example, playing back music or providing telephone functionality through the speaker and microphone.

A display controller and display device 909 provide a visual user interface for the user; this digital interface may include a graphical user interface which is similar to that shown on a Macintosh computer when running OS X operating system software, or Apple iPhone when running the iOS operating system, etc. The system 900 also includes one or more wireless transceivers 903 to communicate with another data processing system, such as the system 900 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 10 may also be used in a data processing system. The system 900 further includes one or more communications ports 917 to communicate with another data processing system, such as the system 900 of FIG. 9. The communications port may be a USB port, Firewire port, Bluetooth interface, etc.

The data processing system 900 also includes one or more input devices 913, which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 13 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems, which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, voice-driven device (e.g., smart speaker), movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "examining," "communicating," "sending," "receiving," "loading," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
receiving, at a media playing device, a media playlist for content, wherein the media playlist references a plurality of media streams and each of the plurality of media streams are encoded at a different bit rate;
determining an initial media stream selected from the plurality of media stream wherein the initial media stream includes a plurality of media segments;
examining a window of the plurality of media segments of the initial media stream;
determining a local bit rate curve of the initial media stream from the window of the plurality of media segments using an average bit rate, as represented in the media playlist, for each of the plurality of media segments in the window of the plurality of media segments, wherein the average bit rate for each segment is determined using segment data of each of the plurality of media segments in the window of the plurality of media segments and the segment data is retrieved from the media playlist;
determining a local bit rate curve of a second media stream from the local bit rate curve of the initial media stream and a representation of average bit rate for the second media stream in the media playlist; and
selecting another one of the plurality of media streams using at least the local bit rate curves.

2. The method of claim 1, further comprising:
processing the selected media stream.

3. The method of claim 1, wherein the media playlist includes a plurality of media stream playlist entries and each of the plurality of media stream playlist entries includes a reference to a media stream playlist and a bit rate for that media stream playlist.

4. The method of claim 3, wherein a media stream playlist includes the plurality of media segments.

5. The method of claim 1, wherein the determining of the local bit rate curve further comprises:
determining a segment average bit rate for each of the plurality of media segments; and
generating the local bit rate curve from the plurality of segment average bit rates.

6. The method of claim 5, wherein the determining of the local bit rate curve further comprises:
smoothing the local bit rate curve.

7. The method of claim 5, the determining of the local bit rate curve further comprises:
generating the local bit rate curve by associating each segment average bit rate with a time value for the segment.

8. A device comprising:
at least one processor;
a memory coupled to the processor though a bus storing program instructions that, when executed by the processor, causes the processor to:
receive a media play list for the content, wherein the media play list references a plurality of media streams and each of the plurality of media streams are encoded at a different bit rate,
determine an initial media stream selected from the plurality of media stream, wherein the initial media stream includes a plurality of media segments,
examine a window of the plurality of media segments of the initial media stream,
determine a local bit rate curve of the initial media stream from the window of the plurality of media segments using an average bit rate, as represented in the media playlist, for each of the plurality of media segments in the window of the plurality of media segments,
determine a local bit rate curve of a second media stream from the local bit rate curve of the initial media stream and a representation of average bit rate for the second media stream in the media playlist; and
select another one of the plurality of media streams using at least the local bit rate curves, wherein the average bit rate for each segment is determined using segment data of each of the plurality of media segments in the window of the plurality of media segments and the segment data is retrieved from the media playlist.

9. A non-transitory machine-readable medium having executable instructions to cause one or more processing units to perform a method to receive streaming content, the method comprising:
receiving, at a media playing device, a media playlist for the content, wherein the media playlist references a plurality of media streams and each of the plurality of media streams are encoded at a different bit rate;
determining an initial media stream selected from the plurality of media streams, wherein the initial media stream includes a plurality of media segments;
examining a window of the plurality of media segments of the initial media stream;
determining a local bit rate curve of the initial media stream from the window of the plurality of media segments using an average bit rate, as represented in the media playlist, for each of the plurality of media segments in the window of the plurality of media segments, wherein the average bit rate for each segment is determined using segment data of each of the plurality of media segments in the window of the plurality of media segments and the segment data is retrieved from the media playlist;
determining a local bit rate curve of a second media stream from the local bit rate curve of the initial media stream and a representation of average bit rate for the second media stream in the media playlist; and
selecting another one of the plurality of media streams using at least the local bit rate curves.

10. The non-transitory machine-readable medium of claim 9, wherein the method further comprises:
processing the selected media stream.

11. The non-transitory machine-readable medium of claim 9, wherein the media playlist includes a plurality of media stream playlist entries and each of the plurality of media stream playlist entries includes a reference to a media stream playlist and a bit rate for that media stream playlist.

12. The non-transitory machine-readable medium of claim 11, wherein a media stream playlist includes the plurality of media segments.

13. The non-transitory machine-readable medium of claim 12, wherein each of the plurality of media segments includes a duration, a bit rate, and a reference to content for the media stream.

14. The non-transitory machine-readable medium of claim 12, wherein each of the plurality of media segments includes a duration, a byte range, and a reference to content for the media stream.

15. The non-transitory machine-readable medium of claim 9, wherein the determining of the local bit rate curve further comprises:
   generating the local bit rate curve from the plurality of segment average bit rates.

16. The non-transitory machine-readable medium of claim 15, wherein the determining of the local bit rate curve further comprises:
   smoothing the local bit rate curve.

17. The non-transitory machine-readable medium of claim 15, wherein the determining of the local bit rate curve further comprises:
   generating the local bit rate curve by associating each segment average bit rate with a time value for the segment.

18. The non-transitory machine-readable medium of claim 9, wherein the method further comprises:
   determining a peak bit rate for the window using the local bit rate curve.

19. The non-transitory machine-readable medium of claim 18, wherein the selection of the another one of the plurality of media stream comprises:
   determining if a current network speed matches the peak bit rate; and
   when the network speed does not match the peak bit rate, selecting the another one of the plurality of media stream.

20. The non-transitory machine-readable medium of claim 19, wherein the current network speed matches the peak bit rate when the peak bit rate is a highest available of the bit rate tiers that are at or below the network speed.

* * * * *